US012747362B2

(12) United States Patent
Wu et al.

(10) Patent No.: US 12,747,362 B2
(45) Date of Patent: Sep. 29, 2026

(54) COATING COMPOSITION, AN ARTICLE MADE THEREOF AND A PROCESS FOR PREPARING THE SAME

(71) Applicant: Sherwin-Williams (Guangdong) New Material Co., Ltd., Guangdong (CN)

(72) Inventors: Sai Wu, Guangdong (CN); Jun Zhang, Guangdong (CN); Yijiang Liu, Guangdong (CN); Rong Xiong, Guangdong (CN)

(73) Assignee: Sherwin-Williams (Guangdong) New Material Co., Ltd., Guangdong (CN)

( * ) Notice: Subject to any disclaimer, the term of this patent is extended or adjusted under 35 U.S.C. 154(b) by 615 days.

(21) Appl. No.: 18/020,309

(22) PCT Filed: Aug. 26, 2021

(86) PCT No.: PCT/CN2021/114716
§ 371 (c)(1),
(2) Date: Feb. 8, 2023

(87) PCT Pub. No.: WO2022/048487
PCT Pub. Date: Mar. 10, 2022

(65) Prior Publication Data

US 2023/0265298 A1 Aug. 24, 2023

(30) Foreign Application Priority Data

Sep. 1, 2020 (CN) ......................... 202010902706.2

(51) Int. Cl.
*C08K 5/29* (2006.01)
*C08K 5/5419* (2006.01)
*C09D 7/63* (2018.01)
*C09D 7/65* (2018.01)
*C09D 133/08* (2006.01)
*C09D 175/04* (2006.01)

(52) U.S. Cl.
CPC .................. *C09D 7/63* (2018.01); *C08K 5/29* (2013.01); *C08K 5/5419* (2013.01); *C09D 7/65* (2018.01); *C09D 133/08* (2013.01); *C09D 175/04* (2013.01)

(58) Field of Classification Search
CPC .......... C09D 7/63; C09D 7/65; C09D 133/08; C09D 175/04; C09D 5/002; C09D 5/02; C09D 175/02; C09D 5/024; C09D 175/14; C08K 5/29; C08K 5/5419; C08G 18/622; C08G 18/775; C08G 18/778; C08G 18/791; C08L 83/06
See application file for complete search history.

(56) References Cited

U.S. PATENT DOCUMENTS

| | | | | |
|---|---|---|---|---|
| 2007/0286959 | A1 | 12/2007 | Palmer | |
| 2018/0016463 | A1 * | 1/2018 | Zhang | ..................... E01C 13/00 |

FOREIGN PATENT DOCUMENTS

| | | | |
|---|---|---|---|
| CN | 1407014 | A | 4/2003 |
| CN | 103270122 | A | 8/2013 |
| CN | 107619465 | * | 1/2018 |
| CN | 107619465 | A | 1/2018 |
| JP | 2005272592 | * | 10/2005 |
| JP | 2005272592 | A | 10/2005 |
| JP | 2009249491 | A | 10/2009 |
| JP | 2019085511 | A | 6/2019 |
| WO | 2008118287 | A1 | 10/2008 |
| WO | 2020092895 | A1 | 5/2020 |

OTHER PUBLICATIONS

International Search Report and Written Opinion from corresponding International Application No. PCT/CN2021/114716, mailed on Feb. 14, 2022, 12 pages.
Wakayama Y "Resin composition for adhesive agent, is obtained by mixing preset amount of silane-coupling agent with urethane-type resin emulsion having carboxyl group, and isocyanate group crosslinking-agent," WPI/Thomson, vol. 2005, No. 77, Oct. 6, 2005, XP002590986.

* cited by examiner

*Primary Examiner* — Kumar R Bhushan
(74) *Attorney, Agent, or Firm* — Tucker Ellis LLP

(57) ABSTRACT

The present application relates to a coating composition, a process for preparing the coating composition and an article containing a coating formed by the coating composition. It relates in particular to a dual-curing coating system, comprising: a film-forming resin composition comprising an aqueous dispersion of at least one carboxyl functional polymer; a first crosslinking agent comprising an epoxy silane; and a second crosslinking agent comprising an isocyanate.

20 Claims, No Drawings

COATING COMPOSITION, AN ARTICLE MADE THEREOF AND A PROCESS FOR PREPARING THE SAME

TECHNICAL FIELD

The present disclosure relates to a coating composition, and also relates to a process for preparing the coating composition and an article containing a coating formed by the coating composition, wherein the coating formed by the coating composition has good water resistance.

BACKGROUND

The coating composition is applied to various products used in residential applications, commercial applications, and industrial applications. These products, such as wood products such as furniture, floors, frames, decks, stairs, fences, etc., usually contain coatings that provide protective and/or aesthetic properties to the underlying wood material. The application of such coatings can improve the durability (such as water resistance) and weather resistance of wood products, thereby extending the service life of the products.

Previously, in the coating market, aziridine was used as a crosslinking agent to solve the problem of water resistance of the coating. However, due to the production process, there are a lot of free aziridine monomers, which can cause serious sensitization to workers, so aziridine has been banned in the client. Later, people use epoxy silane and carbodiimide to replace aziridine, but the crosslinking density and crosslinking speed thereof are far from the requirements, and there is a huge gap in water resistance.

Therefore, the coating field needs a coating composition that can balance crosslinking density and crosslinking speed, and improve the water resistance of the coating.

SUMMARY

The present application provides a coating composition including:

- a film-forming resin composition comprising an aqueous dispersion of at least one carboxyl functional polymer;
- a first crosslinking agent comprising an epoxy silane; and
- a second crosslinking agent comprising an isocyanate.

In the embodiments according to the present application, the aqueous dispersion of at least one carboxyl functional polymer is selected from one or more of aqueous acrylic polymer dispersion, aqueous polyurethane polymer dispersion and aqueous polyurethane/acrylic acid composite dispersion.

According to another aspect of the present application, a coating composition is provided, relative to the total weight of the coating composition, including:

- 85-99 wt % of the film-forming resin composition;
- 0.1-5 wt % of the epoxy silane; and
- 0.5-12 wt % of the isocyanate.

According to another aspect of the present application, a process for preparing the coating composition according to the present application is provided, including:

- providing the film-forming resin composition, the first crosslinking agent and the second crosslinking agent;
- premixing the film-forming resin composition with the first crosslinking agent to obtain a premix; and
- mixing the second crosslinking agent with the premix to obtain a coatable coating composition;

or including:

- providing the film-forming resin composition, the first crosslinking agent and the second crosslinking agent; and
- mixing the film-forming resin composition, the first crosslinking agent and the second crosslinking agent to obtain a coatable coating composition.

According to another aspect of what is disclosed herein, an article is provided, including: a substrate having at least one surface; a coating on the at least one surface and formed from the coating composition according to the present application or the coating composition obtained by the process according to the present application.

It has been surprisingly found that in a coating system containing an aqueous dispersion of at least one carboxyl functional polymer as a film-forming resin, epoxy silane was used as the first crosslinking component, and on this basis, isocyanate was introduced as the second crosslinking component, thus double crosslinking curing greatly improves the water resistance of the formed coating, which makes the coating formed by crosslinking suitable for occasions with higher water resistance requirements.

More surprisingly in the process for the preparation of the coating composition of the present application, if the film-forming resin composition and the first crosslinking agent are mixed in advance to obtain a premix, then during application, not only the second crosslinking agent is mixed with the premix to obtain a coatable coating composition, the premix has a shelf life of no more than 120 days, but also compared with the method in which the film-forming resin composition, the first crosslinking agent and the second crosslinking agent are mixed to obtain a coatable coating composition, the water resistance of the coating can be further improved, which has never been recognized before the present application.

The details of one or more embodiments of the disclosure are set forth in the following description. Other features, objects, and advantages of the disclosure will be apparent from the description and from the claims.

Selected Definitions

As used herein, "a", "an", "the", "at least one", and "one or more" are used interchangeably, unless indicated otherwise. Thus, for example, a coating composition that comprises "an" additive can be interpreted to mean that the coating composition includes "one or more" additives.

Throughout the present disclosure, where compositions are described as having, including, or comprising specific components or fractions, or where processes are described as having, including, or comprising specific process steps, it is contemplated that the compositions or processes as disclosed herein may further comprise other components or fractions or steps, whether or not specifically mentioned in this disclosure, as long as such components or steps do not affect the basic and novel characteristics of what is disclosed herein, but it is also contemplated that the compositions or processes may consist essentially of, or consist of, the recited components or steps.

For the sake of brevity, only certain ranges are explicitly disclosed herein. However, ranges from any lower limit may be combined with any upper limit to recite a range not explicitly recited, ranges from any lower limit may be combined with any other lower limit to recite a range not explicitly recited, and in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

In the context of the present application, the term "epoxy equivalent" refers to the mass of epoxy resin containing 1 mol of epoxy groups. Generally, the lower the epoxy equivalent is, the more epoxy groups contained in the epoxy resin, and the higher the reactivity is. In the embodiments of the present application, the epoxy equivalent of the epoxy resin is usually provided by the supplier.

When used in the context of a substrate, the term "major surface" is the surface formed by the length and width dimensions of the substrate for providing decoration.

As used herein, the term "primer" refers to a coating composition that can be applied to a substrate and dried, crosslinked, or otherwise hardened to form a non-tacky continuous film with sufficient adhesion to the surface of the substrate.

As used herein, the term "topcoat" refers to a coating composition that can be applied to a primer and dried, crosslinked, or otherwise hardened to form a decorative or protective outermost finish coating. Further, such topcoats can withstand long-term outdoor exposure without showing visible and unsatisfactory deterioration.

When used in the context of "applying a coating on a coating", the term "on" includes applying one coating directly or indirectly to another coating.

As used herein, the term "pot life" refers to the time it takes from the mixing of all the components of the coating composition until the viscosity of the system rises to twice, or for systems where the viscosity does not increase significantly over time, refers to the maximum time that the coating formed by the coating composition can meet the performance indicators, also known as the usable time.

As used herein, the term "shelf life of premix" refers to the storage life in which the premix can be applied normally under normal storage conditions (normal temperature and pressure, 40%-70% relative humidity), and the coating can be guaranteed to be normal after construction.

When appearing in this specification and claims, the terms "comprising" and "including" and variations thereof do not have a restrictive meaning.

The terms "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of what is disclosed herein.

DETAILED DESCRIPTION

In an aspect, the present application provides a coating composition comprising:

- a film-forming resin composition comprising an aqueous dispersion of at least one carboxyl functional polymer;
- a first crosslinking agent comprising an epoxy silane; and
- a second crosslinking agent comprising an isocyanate.

Film-Forming Resin Composition

In the embodiments of the present application, the aqueous dispersion of at least one carboxyl functional polymer is selected from one or more of aqueous acrylic polymer dispersion, aqueous polyurethane polymer dispersion and aqueous polyurethane/acrylic acid composite dispersion.

In the present application, the aqueous dispersion of at least one carboxyl functional polymer can be prepared by a suitable polymerization method well known to those of ordinary skill in the art, or any suitable commercially available product can be used.

In one embodiment, the coating composition comprises at least 80% by weight of the film-forming resin composition relative to the total weight of the coating composition. Preferably, the content of the film-forming resin composition is at least 85% by weight, at least 88% by weight, at least 90% by weight or higher, relative to the total weight of the coating composition. According to the present application, the content of the film-forming resin composition relative to the total weight of the coating composition is at most 99% by weight, at most 96% by weight, at most 92% by weight or less.

Preferably, the aqueous dispersion of the at least one carboxyl functional polymer is present in an amount of about 50% by weight, about 55% by weight, about 60% by weight, about 65% by weight to about 70% by weight, about 80% by weight, about 90% by weight, relative to the total weight of the film-forming resin composition.

The film-forming resin composition according to the present application contains a film-forming aid to assist the film-forming of the aqueous dispersion of the at least one carboxyl functional polymer. Suitable film-forming aids include but are not limited to alcohols, such as ethylene glycol, propylene glycol, hexylene glycol, benzyl alcohol, etc.; alcohol esters, such as dodecyl alcohol ester; alcohol ethers, such as ethylene glycol butyl ether (BCS), propylene glycol methyl ether, propylene glycol ethyl ether, propylene glycol n-propyl ether, propylene glycol butyl ether, dipropylene glycol methyl ether, dipropylene glycol propyl ether, dipropylene glycol butyl ether (DPNB), tripropylene glycol n-butyl ether, etc.; alcohol ether esters, such as hexylene glycol butyl ether acetate; diesters. As an example of a diester-based film-forming aid, Coasol 290 plus purchased from Chemoxy, UK can be used.

In a preferred embodiment, the film-forming resin composition comprises about 2 to about 10% by weight, preferably about 2 to about 8% by weight of the film-forming aid relative to the total weight of the film-forming resin composition. Specifically, the amount of the film-forming aid contained in the film-forming resin composition is, relative to the total weight of the film-forming resin composition, from about 2% by weight, about 3% by weight, about 4% by weight, about 5 wt % to about 10 wt %, about 9 wt %, or about 8 wt %.

If necessary, the film-forming resin composition according to the present application may optionally contain one or more fillers. The term "filler" as used herein refers to any volume extender suitable for coatings, which may be organic or inorganic, for example, in the form of particles. There is no particular limitation on the shape of the particles, and they can have any appropriate shape. The average particle size of the filler can vary within a wide range, for example within a range of about 10 nanometers to about 50 microns. Some fillers, in addition to functioning as volume extenders, also impart one or more desired properties to the composition and/or the coating formed from the composition. For example, some fillers can impart the desired color to the composition and the coating resulting from the composition. In this case, this filler is also called "pigment". Some fillers can improve the chemical and/or physical properties, especially the mechanical properties of the coating obtained from the composition. In this case, such filler is also called "reinforcing filler".

In the embodiments of the present application, suitable fillers may include but are not limited to, for example, zinc stearate, china clay, wollastonite, barite, calcium carbonate, diatomaceous earth, talc, barium sulfate, magnesium aluminum silicate, silicon dioxide, and any combination thereof. Preferably, the filler is one or two of zinc stearate and talc.

In the embodiment of the present application, the film-forming resin composition may further comprise additional additives commonly used in aqueous coating composition, and these additives will not adversely affect the coating composition or the cured coating obtained therefrom. Suitable additives include but are not limited to, for example, those that can be used to improve the processability or manufacturability of the composition, enhance composition aesthetics, or improve a particular functional property or characteristic of the coating composition or the cured composition resulting therefrom, such as adhesion to a substrate. Suitable examples of the additive include but are not limited to, such as carriers, film forming auxiliaries, emulsifiers, pigments, fillers, anti-migration aids, antibacterial agents, chain extenders, lubricants, wetting agents, biocides, plasticizers, antifoaming agent, coloring agent, wax, antioxidant, anticorrosive, flow control agent, thixotropic agent, dispersant, adhesion promoter, UV stabilizer, thickener, defoamer, pH adjuster, or combination. The content of each optional ingredient is sufficient to achieve its intended purpose, but preferably such an amount does not adversely affect the coating composition or the cured coating obtained therefrom. In the preferred embodiment of the present application, suitable additional additives include carriers, thickeners, surfactants, defoamers, wetting agents, pH adjusters, preservatives, fungicides, or any combination thereof.

Suitable thickeners may comprise but are not limited to cellulose ether thickeners, alkali swelling thickeners, polyurethane thickeners, hydrophobically modified polyurethane thickeners, or any combination thereof. All types of thickeners are commercially available products.

In a preferred embodiment, the film-forming resin composition comprises from about 0.1% by weight to about 2% by weight, preferably about 0.4% by weight to about 1.0% by weight of the thicker, relative to the total weight of the film-forming resin composition. Specifically, the amount of thickener contained in the film-forming resin composition is, relative to the total weight of the film-forming resin composition, from about 0.2% by weight, about 0.3% by weight, about 0.4% by weight, about 0.5% by weight, about 0.6% by weight, about 0.7% by weight, about 0.8% by weight, or about 0.9% by weight to about 2.0% by weight, about 1.5% by weight, about 1.0% by weight.

Suitable dispersants may comprise but are not limited to anionic dispersants, cationic dispersants, nonionic dispersants, amphoteric dispersants, or any combination thereof. All types of dispersants are commercially available products. In a preferred embodiment, suitable dispersants include polyacrylate dispersants, polymethacrylate dispersants, polycarboxylate dispersants, or any combination thereof.

In a preferred embodiment, the film-forming resin composition, relative to the total weight of the film-forming resin composition, may comprise from about 0.1% by weight to about 1.5% by weight, preferably from about 0.2% by weight to about 0.9% by weight of the dispersant. Specifically, the amount of the dispersant contained in the film-forming resin composition is, relative to the total weight of the film-forming resin composition, from about 0.2% by weight, about 0.3% by weight, about 0.4% by weight, or about 0.5% by weight. % By weight, about 0.6% by weight to about 1.5% by weight, about 1.0% by weight, or about 0.9% by weight.

Suitable defoamers may include but are not limited to organosiloxane defoamers, grease defoamers, polyether defoamers, polyether modified silicone defoamers, or any combination thereof. All types of defoamers are commercially available products.

In a preferred embodiment, the film-forming resin composition comprises from about 0.1% by weight to about 1% by weight, preferably about 0.2% by weight to about 0.8% by weight of the defoamer, relative to the total weight of the film-forming resin composition. Specifically, the amount of the defoamer contained in the film-forming resin composition is, relative to the total weight of the film-forming resin composition, from about 0.1% by weight, about 0.2% by weight, 0.3% by weight, or about 0.4% by weight. % By weight, about 0.5% by weight, or about 0.6% by weight to about 1.0% by weight, about 0.9% by weight, or about 0.8% by weight.

Suitable wetting agents may include but are not limited to silicone-based wetting agents, acetylene glycol-based wetting agents, or combinations thereof. All types of wetting agents are commercially available products.

In a preferred embodiment, the film-forming resin composition comprises from about 0.1% by weight to about 2% by weight, preferably about 0.4% by weight to about 1.0% by weight of the wetting agent, relative to the total weight of the film-forming resin composition. D. Specifically, the amount of the wetting agent contained in the film-forming resin composition is, relative to the total weight of the film-forming resin composition, from about 0.2% by weight, about 0.3% by weight, about 0.4% by weight, about 0.5% by weight, about 0.6% by weight, about 0.7% by weight, about 0.8% by weight, or about 0.9% by weight to about 2.0% by weight, about 1.5% by weight, about 1.0% by weight.

Suitable pH adjusting agents may include but are not limited to anhydrous sodium carbonate, sodium hydroxide, potassium hydroxide, sodium bicarbonate, alcohol amines, ammonia, organic amines or any combination thereof. In a preferred embodiment, the pH adjusting agent includes ammonia water, organic amines, or a combination thereof.

In a preferred embodiment, the film-forming resin composition comprises from about 0.1 to about 1.0% by weight, preferably about 0.1 to about 0.3% by weight of the pH adjusting agent, relative to the total weight of the film-forming resin composition. Specifically, the amount of the pH adjusting agent contained in the film-forming resin composition is from about 0.1% by weight or about 0.2% by weight to about 1.0% by weight, 0.7% by weight, about 0.5% by weight, or about 0.3% by weight, relative to the total weight of the film-forming resin composition.

Suitable preservatives may include but are not limited to isothiazolinones, benzimidazoles, substituted aromatic hydrocarbons, organic bromines, organic amines, pipertriazines, or any combination thereof. All types of preservatives are commercially available products.

In a preferred embodiment, the film-forming resin composition comprises from about 0.1 to about 1% by weight, preferably about 0.1 to about 0.5% by weight of a preservative, relative to the total weight of the film-forming resin composition. Specifically, the amount of the preservative contained in the film-forming resin composition is, relative to the total weight of the film-forming resin composition, from about 0.1% by weight, 0.2% by weight, about 0.3% by weight or about 0.4% by weight % to about 1.0% by weight, about 0.9% by weight, about 0.7% by weight, or about 0.5% by weight.

Suitable fungicides may include but are not limited to isothiazolinones, benzimidazoles, iodopropargyls, substituted aromatic hydrocarbons, dithiocarbamates, carbendazim diuron, or any combination thereof. All types of fungicides are commercially available products.

In a preferred embodiment, the film-forming resin composition comprises from about 0.1 to about 1% by weight, preferably about 0.1 to about 0.5% by weight of the fungicide, relative to the total weight of the film-forming resin composition. Specifically, the amount of the fungicide contained in the film-forming resin composition is, relative to the total weight of the film-forming resin composition, from about 0.1% by weight, 0.2% by weight, about 0.3% by weight, or about 0.4% by weight to about 1.0% by weight, about 0.9% by weight, about 0.7% by weight, or about 0.5% by weight.

Any appropriate aqueous medium can be used to adjust the viscosity of the film-forming resin composition. Suitable aqueous media may include but are not limited to water-soluble organic solvents, water and mixtures thereof. The aqueous medium is selected to adjust the viscosity of the film-forming resin composition for further formulation.

Suitable water-soluble organic solvents may include alcohols (such as ethanol, n-propanol, isopropanol, n-butanol, isobutanol, etc.); ketones (such as acetone, 2-butanone, cyclohexanone, methyl aryl ketone, ethyl aryl ketone, methyl isoamyl ketone, etc.); glycols (such as butyl glycol); glycol ethers (such as ethylene glycol monomethyl ether, ethylene glycol mono ethyl ether, ethylene glycol monobutyl ether, propylene glycol monomethyl ether, methoxypropanol, dipropylene glycol methyl ether, etc.), glycol esters (such as butyl glycol acetate, methoxypropyl acetate, etc.); and mixtures thereof. Preferably, glycol ethers are used as organic solvents.

The amount of the aqueous medium contained in the film-forming resin composition may vary, for example, according to the coating method and the required viscosity. A preferred embodiment of the film-forming resin composition contains 2-20% by weight of an aqueous medium, more preferably 2-10% by weight of water.

The content of each optional component is sufficient to achieve its intended purpose, but preferably, such content does not adversely affect the film-forming resin composition or the cured coating obtained therefrom. According to certain embodiments of the present application, the total amount of additional additives is in the range of about 0% to about 20% by weight, preferably about 1% to about 10% by weight, relative to the total weight of the film-forming resin composition.

In one embodiment, the film-forming resin composition disclosed herein comprises, relative to the total weight of the film-forming resin composition:

50 to 90% by weight of an aqueous dispersion of at least one carboxyl functional polymer;

2 to 10% by weight of film-forming aids;

2 to 20% by weight of an aqueous medium;

0 to 10% by weight of a filler; and 1 to 10% by weight of additional additives;

wherein, the additional additives are selected from one or more of thickeners, wetting agents, defoamers, dispersants, pH regulators, fungicides, and preservatives.

Epoxy Silane

In the embodiment of the present application, the epoxy silane has the following general formula:

(Formula 1)

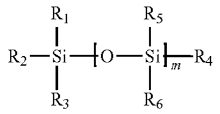

in which $R_1$, $R_2$, $R_4$ and $R_5$ are each independently $C_1$-$C_6$ alkyl, $C_6$-$C_{10}$ aryl, halogen, hydroxyl, $C_1$-$C_6$ alkoxy, $C_2$-$C_6$ alkenyloxy, $C_6$-$C_{10}$ aryloxy, $C_1$-$C_6$ alkanoyloxy and $C_6$-$C_{10}$ aroyloxy, wherein $R_1$, $R_2$, $R_4$ and $R_5$ may be the same or different;

$R_3$ and $R_6$ are each independently E-$R_7$, where E is epoxy ethyl or epoxy cyclohexyl, preferably epoxy ethyl, and $R_7$ is a non-hydrolyzable divalent hydrocarbon group with less than 20 carbon atoms or is a divalent group composed of C, H, N, S and O atoms (these atoms are the only atoms that can exist in the backbone of the divalent group) and having less than 20 carbon atoms;

m is an integer of 0-10.

The epoxy silane used in the embodiment of the present application may be an epoxy silane represented by Formula 1, wherein $R_7$ is any divalent hydrocarbon groups, such as, methylene, ethylene, decylene, cyclohexylene, cyclopentylene, methyl sub-ring hexyl or 2-ethylbutylene, or ethers such as $—CH_2—CH_2—O—CH_2—CH_2—$, $—(CH_2—CH_2O)_2—CH_2—CH_2—$ or $—CH_2O—(CH_2)_3—$.

In an embodiment according to the present application, the epoxy silane has an epoxy equivalent in the range of 3.8-5.5 eq/100 g, preferably an epoxy equivalent in the range of 4-5 eq/100 g, more preferably an epoxy equivalent in the range of 4.1-4.8 eq/100 g. The epoxy silane may be a monofunctional epoxy silane or a multifunctional epoxy silane, and is preferably a multifunctional epoxy silane.

As a monofunctional epoxy silane, many epoxy-functional alkoxysilanes are suitable, including glycidoxymethyl-methoxysilane, glycidoxymethyltriethoxysilane, glycidoxymethyl-tripropoxysilane, glycidoxymethyl-tributoxysilane, β-glycidoxyethyltrimethoxysilane, β-glycidoxyethyltriethoxysiiane, β-glycidoxyethyl-tripropoxysilane, β-glycidoxyethyl-tributoxysilane, β-glycidoxyethyltrimethoxysilane, α-glycidoxyethyl-triethoxysilane, α-glycidoxyethyl-tripropoxysilane, glycidoxyethyltributoxysilane, γ-glycidoxypropyl-trimethoxysilane, 7-glycidoxypropyl triethoxysilane, γ-glycidoxypropyl-tripropoxysilane, 7-glycidoxypropyltributoxysilane, β-glycidoxypropyl-triethoxysilane, β-glycidoxypropyl-triethoxysilane, β-glycidoxypropyl-tripropoxysilane, β-glycidoxypropyltributoxysilane, α-glycidoxypropyl-trimethoxysilane, α-glycidoxypropyl-triethoxysilane, α-glycidoxypropyl-tripropoxysilane, α-glycidoxypropyltributoxysilane, γ-glycidoxybutyl-trimethoxysilane, δ-glycidoxybutyl-triethoxysilane, δ-glycidoxybutyl-tripropoxysilane, δ-glycidoxybutyl-ributoxysilane, δ-glycidoxybutyl-trimethoxysilane, γ-glycidoxybutyl-triethoxysilane, γ-glycidoxybutyl-tripropoxysilane, γ-propoxybutyl-tributoxysilane, δ-glycidoxybutyl-trimethoxysilane, glycidoxybutyl-triethoxysilane, δ-glycidoxybutyl-tripropoxysilane, α-glycidoxybutyl-trimethoxysilane, glycidoxybutyl-triethoxysilane, a-glycidoxybutyl-tripropoxysilane, a-glycidoxybutyl-tributoxysilane, (3,4-epoxycyclohex-methyl-trimethoxysilane, (3,4-epoxycyclohexyl)methyl-triethoxysilane, (3,4-epoxycyclohexylmethyl-tripropoxysilane, (3,4-epoxycyclohexyl)-methyl-tributoxysilane, (3,4-epoxycyclohexylethyl-trimethoxysilane, (3,4-epoxycyclohexyl)ethyl-triethoxysilane, (3,4-epoxycyclohexyl)ethyl-tripropoxysilane, (3,4-epoxycyclohexyl)-ethyl-tributoxysilane, (3,4-epoxycyclohexyl)propyl-trimethoxysilane, (3,4-epoxycyclohexyl)propyl-triethoxysilane, (3,4-epoxycyclohexyl)propyl-tripropoxysilane, (3,4-epoxycyclohexyl)propyl-tributoxysilane, (3,4-epoxycyclohexyl)butyl-trimethoxysilane, (3,4-epoxycyclohexyl) butyl-triethoxysilane, (3,4-epoxycyclohexyl)-butyl-tripropoxysilane, and (3,4-epoxycyclohexyl)butyl-tributoxysilane.

The preferred monofunctional epoxy silane is epoxyalkyl alkoxy silane. Particularly preferred epoxyalkyl alkoxy silane is γ-glycidoxypropyl trimethoxysilane, γ-glycidoxypropyl methyl diethoxy silane and β-(3,4-epoxycyclohexyl) ethyl-trimethoxysilane.

It has also been found that epoxy silanes (namely, both monofunctional and multifunctional epoxy silanes) can improve the water resistance of the coating system through the formation of siloxane and the crosslinking of epoxy groups and carboxyl groups.

In one embodiment, the coating composition comprises, relative to the total weight of the coating composition, at least 0.1% by weight of epoxy silane, preferably at least 0.5% by weight of epoxy silane. According to the present application, it is preferable that the coating composition has a higher concentration of epoxy silane, but considering the actual conditions, the content of epoxy silane, relative to the total weight of the coating composition, is at most 5% by weight, at most 4% by weight, at most 3% by weight, at most 2% by weight, at most 1% by weight or less. Preferably, a multifunctional epoxy silane is used.

Isocyanate

In an embodiment according to the present application, the isocyanate is selected from one or more of aliphatic polyisocyanate, alicyclic polyisocyanate and aromatic polyisocyanate.

The term "isocyanate" as used herein refers to a compound containing at least one isocyanate group (—NCO), which may be a small molecule compound or an oligomer. The term "polyisocyanate" refers to a compound containing at least two isocyanate groups (—NCO). The isocyanate functional group can undergo chain extension and crosslinking reactions with the active hydrogen polymer, thereby forming a three-dimensional network structure in the coating. Suitable isocyanates include aliphatic polyisocyanates, aromatic polyisocyanates, or any combination thereof. The term "aliphatic polyisocyanate" as used herein refers to a polyisocyanate compound in which an isocyanate group is directly connected to an aliphatic chain or ring. The term "aromatic polyisocyanate" as used herein refers to a polyisocyanate compound in which an isocyanate group is directly connected to an aromatic ring.

As examples of suitable polyisocyanate compounds, hexamethylene diisocyanate, dodecamethylene diisocyanate, cyclohexane-1,4-diisocyanate, 4,4'-dicyclohexylmethane diisocyanate, cyclopentane-1,3-diisocyanate, p-phenyl ene diisocyanate, toluene-2,4-diisocyanate, naphthalene-1,4-diisocyanate, biphenyl-4,4'-diisocyanate, benzene-1,2,4-triisocyanate, xylene-1,4-diisocyanate, xylene-1,3-diisocyanate, diphenylmethane diisocyanate, butane-1,2,3-triisocyanate or polymethylene polyphenyl polyisocyanate can be used.

As examples of suitable isocyanate oligomers, polyurethane prepolymers of any of the polyisocyanate compounds listed above, polyester prepolymers of any of the polyisocyanate compounds listed above, or polyether prepolymers of any of the polyisocyanate compounds listed above can be used. The polyurethane prepolymer (for example, hexamethylene diisocyanate (HDI) trimer), polyester prepolymer or polyether prepolymer can be made by any suitable method known to those skilled in the art. For example, a polyurethane prepolymer can be made by reacting a polyol monomer with one or more of the polyisocyanate compounds under appropriate conditions; a polyester prepolymer or a polyether prepolymer can be made by reacting a polyester polyol or polyether polyol with one or more of the polyisocyanate compounds under appropriate conditions. Alternatively, as the polyurethane prepolymer, polyester prepolymer, or polyether prepolymer, any appropriate commercial product can be used. In one embodiment of the present application, the isocyanate includes hexamethylene diisocyanate (HDI) trimer.

In certain embodiments of the present application, the isocyanate is preferably a hydrophilic group-modified and/or at least partially hydrophilic group-modified isocyanate, more preferably a hydrophilic group-modified isocyanate. Hydrophilic group modification can better disperse or emulsify isocyanate in water, and be more suitable for use as a crosslinking agent in aqueous systems. In one embodiment of the present application, the isocyanate includes a water-dispersible polyisocyanate, such as a sulfonic acid-modified hexamethylene diisocyanate (HDI) trimer.

Isocyanates that are not modified by hydrophilic groups are generally referred to as oil-based isocyanates. Generally, oil-based isocyanates are not well dispersed in water-based systems and have poor compatibility with water-based resin systems. However, in some cases, for example, a suitable co-solvent (for example, propylene glycol diacetate (PGDA), ethylene glycol diacetate (EGDA), ethylene glycol dipropionate (EGDP), etc.) can also be used in aqueous systems. Therefore, in some embodiments of the present application, oil-based isocyanates may also be used.

Further preferably, the isocyanate contains at least one isocyanate group and at least one alkoxysilane group.

The aforementioned isocyanate crosslinking agent containing at least one isocyanate group and at least one alkoxysilane group is usually obtained by silane modification of a commercially available isocyanate crosslinking agent. For example, a commercially available sulfonic acid-modified isocyanate trimer is used for silane modification. Under the conditions of room temperature and stirring, the alkoxysilane is reacted with the sulfonic acid-modified isocyanate trimer to make at least a part of —NCO groups of the sulfonic acid-modified isocyanate trimer react with alkoxysilane. The use of isocyanates containing alkoxysilane groups in the coating composition of the present application can help extend the pot life of the coating composition and help to form a denser coating.

In some embodiments of the present application, the second crosslinking agent includes both an isocyanate containing at least one alkoxysilane group and an isocyanate not containing an alkoxysilane group.

It has also been surprisingly found that in a coating system containing an aqueous dispersion of at least one carboxyl functional polymer as a film-forming resin, a first crosslinking agent containing epoxy silane is used, and a second crosslinking agent containing isocyanate is introduced on this basis. The double crosslinked structure greatly improves the water resistance of the system, which makes the coating formed by crosslinking suitable for occasions with higher water resistance requirements. If the isocyanate further contains at least one alkoxysilane group, the water resistance is further improved.

Without wishing to be limited by any theory, the following explanations have been provided so that the present application can be better understood.

In the coating composition of the present application, a film-forming resin composition containing an aqueous dispersion of at least one carboxyl functional polymer, a first crosslinking agent containing epoxy silane, and a second crosslinking agent containing isocyanate, the water resistance of the coating system can be improved by the formation of siloxane and the crosslinking of epoxy groups and carboxyl groups, as shown in the following formula (I), where the reaction of epoxy groups and carboxyl groups makes the system produce hydrophilic hydroxyl group, such hydroxyl group can react with the isocyanate group of the isocyanate crosslinking agent, as shown in the following formula (II), which further enhances the crosslinking density of the coating, thereby improving the water resistance of the coating. If the isocyanate crosslinking agent is siloxane-modified, i.e., containing at least one alkoxysilane group, these groups can react and form a siloxane, thereby further enhancing the crosslinking density of the coating. On the basis of this, the water resistance of the coating is further improved.

(I)

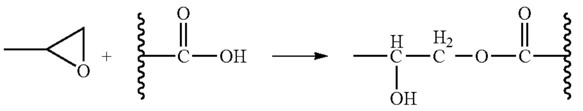

(II)

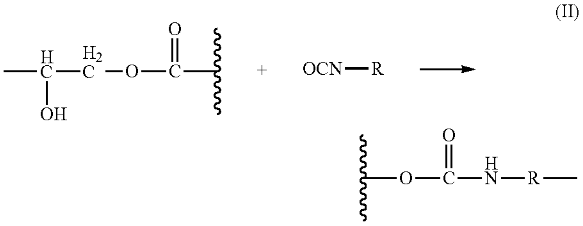

In one embodiment, the coating composition comprises, relative to the total weight of the coating composition, at least 0.5% by weight of isocyanate, preferably at least 1% by weight of isocyanate. According to the present application, it is preferable for the coating composition to have a higher concentration of isocyanate, but considering actual conditions, the content of isocyanate (relative to the total weight of the coating composition) is at most 12% by weight, at most 8% by weight, at most 5% by weight, at most 3% by weight, at most 2% by weight or less. Preferably, the isocyanate includes a water-dispersible polyisocyanate. It is further preferred that the isocyanate contains at least one alkoxysilane group.

Coating Composition

Another aspect of the present application also provides a coating composition, characterized in that, relative to the total weight of the coating composition, it comprises:

85-99% by weight of a film-forming resin composition comprising an aqueous dispersion of at least one carboxyl functional polymer;

0.1-5% by weight of epoxy silane; and 0.5-12% by weight of isocyanate.

According to another aspect of the present application, a process for preparing the coating composition according to the present application is provided, comprising:

providing the film-forming resin composition, the first crosslinking agent and the second crosslinking agent;

premixing the film-forming resin composition with the first crosslinking agent to obtain a premix; and mixing the second crosslinking agent with the premix to obtain a coatable coating composition (this process is also known as a pre-preparation method);

or comprising:

providing the film-forming resin composition, the first crosslinking agent and the second crosslinking agent; and mixing the film-forming resin composition, the first crosslinking agent and the second crosslinking agent to obtain a coatable coating composition (this process is also referred to as a post-addition method).

It has been surprisingly found that in the case of premixing the film-forming resin composition and the first crosslinking agent, the premix has a shelf life of no more than 120 days, more preferably no more than 100 days, and finally obtained coatable coating composition has a pot life of 4-24 hours or more. In addition, it has also been found that in the case of pre-mixing the film-forming resin composition and the first crosslinking agent (i.e., the pre-preparation method), since epoxy silanes can react to form siloxanes and epoxy groups can react with carboxyl groups to produce hydrophilic hydroxyl groups, compared with the post-addition method, pre-mixing actually prolongs the reaction time of the above-mentioned reaction and enhances the crosslinking density of the coating, which further improves the water resistance of the coating. However, the pre-mixing time is not as long as possible, because the pre-mix may not be used further due to excessive reaction. Therefore, although the premix may have a shelf life of 120 days, it is preferably to have a shelf life within 100 days, more preferably within 80 days, still preferably within 50 days, and even more preferably within 30 days, to use the premix for preparing the coating composition.

In addition, increasing the temperature can also speed up the reaction between silane groups and between epoxy groups and carboxyl groups. Therefore, pre-mixing the film-forming resin composition and the first crosslinking agent may be performed at an elevated temperature, for example, at most 40° C. or at most 50° C.

Articles

Compared with the traditional water-based coating composition, the coating formed by the coating composition of the present application has one or more of the following advantages, preferably multiple, more preferably all:

very good fullness, the ducts of the wooden substrate are basically filled;

very high transparency;

higher water resistance, for example, according to the water resistance test described below, there is basically no whitening; in contrast, the traditional water-based coating composition after undergoing the water resistance test under the same coating thickness, not only whitening, but also the surface may become uneven.

Therefore, the coating composition according to the present application has a wide range of applications, and can be used as a sealing primer, a transparent primer, a transparent topcoat, a solid color topcoat, and the like. Thus, the present application also relates to an article comprising: a substrate having at least one major surface; and the coating at least partially applied on the at least one surface and formed from the coating composition according to the present application or the coating composition obtained by the process according to the present application. The coating is formed by the coating composition of the present application at least partially applied directly or indirectly on the main surface. In some embodiments, the coating composition of the present application may be coated on a substrate as one or more, preferably all of a sealer primer, a second primer, and a third primer. In some embodiments, the coating composition of the present application can be coated on a substrate as a transparent topcoat.

The coating composition according to the present application can be at least partially applied using various methods familiar to those skilled in the art, including spraying (for example, air-assisted, airless or electrostatic spraying), brushing, roller coating, overflow coating, and dipping. In one embodiment of the present application, the mixed coating composition is at least partially applied by spraying. The coating composition can be at least partially applied to various wet film thicknesses. In an embodiment of the present application, the wet film thickness preferably provides a dry film thickness of about 13 to about 260 μm (about 0.5 to about 10 mils), and more preferably about 25 to about 75 μm (about 1 to about 3 mils). The applied coating can be cured by air-drying or by using various drying devices (for example, an oven) familiar to those skilled in the art to accelerate the curing.

The coating composition can be at least partially applied to a variety of different substrates using conventional coating techniques. Examples of suitable substrates include wood, cement, cement fiberboard, metals or plastics. Preferably, the coating compositions of the present application are particularly suitable for use on wood substrates. Suitable wood substrates include the substrates derived from wood materials such as oak (e.g. white oak and red oak), pine (e.g. white pine and southern yellow pine), aspen, spruce, cherry, walnut, rosewood, cedar, maple, mahogany, white birch, hickory, walnut, eucalyptus, etc. Further, the wood substrate may be an engineered wood product, wherein the substrate is made of wood chips (e.g., sheets, chips, flakes, fibers, threads).

According to certain embodiments of the present application, the wood substrate has at least one, preferably two major surfaces facing each other. As used herein, the "major surface" is the surface for decoration formed by the length and width dimensions of the wooden substrate.

According to some embodiments of the present application, the wood product can be prepared, for example, by the following steps: (1) providing a polished wood substrate; (2) using a coating and curing process to sequentially coat the coating composition of one or more embodiments of the present application on the wood substrate to form a coating layer to provide the wood substrate with the required properties.

According to certain embodiments of the present application, the wood products thus obtained can be used in the following applications, including, but not limited to: domestic furniture, such as tables, chairs, cabinets, etc., bedroom and bathroom furniture, office furniture; contract furniture such as school and child furniture; hospital furniture, restaurant and hotel furniture, kitchen cabinets and furniture, (flat) panels for interior design, interior and exterior windows and doors, interior and exterior window frames and door frames, exterior and interior sidings and wooden flooring.

The present disclosure is more particularly described in the following examples that are intended as illustrations only, since numerous modifications and variations within the scope of the present disclosure will be apparent to those skilled in the art. Unless otherwise noted, all parts, percentages, and ratios reported in the following examples are on a weight basis, and all reagents used in the examples are commercially available and used directly without further treatment.

EXAMPLES

Testing Methods

Fullness: making the coating composition into a film under the same material and process conditions, and visually comparing the fullness of each coating.

Transparency: making the coating composition into a film under the same material and process conditions, and visually comparing the transparency of each coating.

Water resistance: baking the paint film with a wet film thickness of 100-120 $g/m^2$ at 40° C. for 2 hours and leaving it at room temperature for 7 days; sprinkling water on the dry film and place a 500 g bowl to ensure that the paint film on the bottom of the bowl is filled with water; leave it at room temperature for 24 hours, removing the bowl after 24 hours, and visually inspecting the whiteness of the paint film. The visual water resistance can be evaluated on a scale of 0-5, with 5 being the best and 0 being the worst.

Adhesion

An adhesion test was performed to assess whether the coating was adhered to the coated substrate. The adhesion test was performed according to ASTM D 3359—Test Method B. Adhesion is usually classified as 0-5, with 5 being the best and 0 being the worst.

Materials

The materials used are listed in Table 1 below.

TABLE 1

| Chemical Type | Description |
|---|---|
| Monofunctional Epoxy Silane | γ-glycidoxypropyl trimethoxysilane |
| Multifunctional Epoxy Silane | Multifunctional epoxy silane with gamma-glycidoxy propyl epoxide ring |
| Carboxyl Functional Polymer | Composite aqueous dispersion of polyurethane/acrylic |
| Isocyanate | Sulfonic acid-modified isocyanate trimer |

Example 1: Synthesis of Silane-Modified Isocyanate

Under the conditions of room temperature and stirring, bis(3-trimethoxysilylpropyl)amine was reacted with a commercially available sulfonic acid-modified isocyanate trimer at a molar ratio of 2:1 to obtain silane-modified isocyanate.

Preparation of the Coating Composition of Examples 2-6 and the Coating Composition of Comparative Examples 1-3

The coating composition was formulated according to the components and amounts shown in Table 2.

The coating compositions of Examples 2-4 and Comparative Examples 1-2 were prepared by adding each component to a mixing container and mixing, and then stirring at 800-1000 rpm until uniform, so as to obtain a coatable coating composition.

The coating compositions of Examples 5 and 6 were prepared by mixing the film-forming resin composition and epoxy silane crosslinking agent in advance to obtain a premix, standing at room temperature for 7 days, and then mixing it with isocyanate crosslinking agent to obtain a coatable coating composition.

In the coating composition of Comparative Example 3, the film-forming resin composition and the epoxy silane crosslinking agent were mixed, and then allowed to stand at room temperature for 7 days to obtain a coatable coating composition.

TABLE 2

Composition and coating properties of the coating composition

| Composition | Example 2 | Example 3 | Example 4 | Example 5 | Example 6 | Comparative Example 1 | Comparative Example 2 | Comparative Example 3 |
|---|---|---|---|---|---|---|---|---|
| Carboxyl Functional Polymer | 80 | 80 | 80 | 80 | 80 | 80 | 80 | 80 |
| Film forming aids | 7 | 7 | 7 | 7 | 7 | 7 | 7 | 7 |
| Filler | 1 | 1 | 1 | 1 | 1 | 1 | 1 | 1 |
| Other additives | 5 | 5 | 5 | 5 | 5 | 5 | 5 | 5 |
| Water | 7 | 7 | 7 | 7 | 7 | 7 | 7 | 7 |
| γ-glycidoxypropyl trimethoxysilane | 1 | — | — | — | — | 1 | — | — |
| Multifunctional Epoxy Silane with gamma-glycidoxy propyl epoxide ring | — | 1 | 1 | 1 | 1 | — | 1 | 1 |
| Sulfonic acid-modified isocyanate trimer | 3 | 3 | — | 3 | — | — | — | |
| Silane modified isocyanate (Example 1) | — | — | 3 | — | 3 | — | — | — |
| Pot life (h) | 4 | 4 | 12 | 4 | 12 | — | — | — |
| Coating performance | | | | | | | | |
| Fullness | Best | Best | Best | Best | Best | Best | Best | Best |
| Transparency | Best | Best | Best | Best | Best | Best | Best | Best |
| Water resistance | 3 | 4 | 4 | 4 | 5 | 2 | 2 | 3 |
| Adhesion | 5 | 5 | 5 | 5 | 5 | 5 | 5 | 5 |

Coating

The coating compositions prepared according to the above Examples 2-6 and Comparative Examples 1-3 were coated on the surface of the cherry wood substrate to form a coating. Then, the performance of the coating was tested, and the results were shown in Table 2 above.

According to the experimental data in Table 2, compared with the single curing system containing only epoxy silane crosslinking agent (Comparative Examples 1-3), on the basis of the first crosslinking agent containing epoxy silane, the second crosslinking agent containing isocyanate was introduced, dual crosslinking curing system greatly improved the water resistance of the coating, so that the coating formed after crosslinking was suitable for occasions with higher water resistance requirements. According to the data of Example 1 and Example 2 in Table 2, it can be seen that the use of multifunctional epoxy silane as the first crosslinking agent can improve the water resistance of the formed coating more than the use of monofunctional epoxy silane.

According to the data of Examples 4 and 6 in Table 2, it can be seen that after the second crosslinking agent isocyanate was modified by silane, the prepared coating composition had a significantly longer pot life.

It can be seen from the results in Table 2 that, compared to the method of mixing two crosslinking agents with the film-forming resin composition at the same time to prepare the coating composition, the process of adding the epoxy silane crosslinking agent to the formulation in advance can be further improved the water resistance of the coating.

Embodiments

Embodiment 1: A coating composition comprising: a film-forming resin composition comprising an aqueous dispersion of at least one carboxyl functional polymer; a first crosslinking agent comprising an epoxy silane; and a second crosslinking agent comprising an isocyanate.

Embodiment 2: An embodiment of Embodiment 1, wherein the aqueous dispersion of the at least one carboxyl functional polymer is selected from one or more of aqueous acrylic polymer dispersion, aqueous polyurethane polymer dispersion and aqueous polyurethane/acrylic acid composite dispersion.

Embodiment 3: An embodiment of any of Embodiments 1-2, wherein the epoxy silane has the following formula:

(Formula 1)

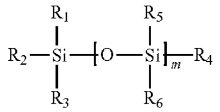

wherein $R_1$, $R_2$, $R_4$ and $R_5$ are each independently selected from $C_1$-$C_6$ alkyl group, $C_6$-$C_{10}$ aryl group, halogen, hydroxyl group, $C_1$-$C_6$ alkoxy group, $C_2$-$C_6$ alkenyloxy, $C_6$-$C_{10}$ aryloxy group, $C_1$-$C_6$ alkanoyloxy and $C_6$-$C_{10}$ aroyloxy, and wherein $R_1$, $R_2$, $R_4$ and $R_5$ may be the same or different;

$R_3$ and $R_6$ are each independently selected from E-$R_7$, where E is glycidoxy or epoxycyclohexyl, and $R_7$ is a non-hydrolyzable divalent hydrocarbon group having less than 20 carbon atoms or a divalent group composed of C, H, N, S and O atoms (these atoms can be the only atoms that exist in the divalent backbone) having less than 20 carbon atoms; and m is an integer from 0-10.

Embodiment 4: An embodiment of any of Embodiments 1-3, wherein the epoxy silane has an epoxy equivalent weight in the range of 3.8-5.5 eq/100 g.

Embodiment 5: An embodiment of any of Embodiments 1-4, wherein the isocyanate is selected from one or more of aliphatic polyisocyanate, alicyclic polyisocyanate and aromatic polyisocyanate.

Embodiment 6: An embodiment of any of Embodiments 1-4, wherein the isocyanate comprises hexamethylene diisocyanate (HDI) trimer.

Embodiment 7: An embodiment of any of Embodiments 1-4, wherein the isocyanate comprises water-dispersible polyisocyanate.

Embodiment 8: An embodiment of any of Embodiments 1-4, wherein the isocyanate contains at least one alkoxysilane group.

Embodiment 9: An embodiment of any of Embodiments 1-8, characterized in that, relative to the total weight of the coating composition, comprising: 85-99 wt % of the film-forming resin composition; 0.1-5 wt % of the epoxy silane; and 0.5-12 wt % of the isocyanate.

Embodiment 10: A process for preparing a coating composition of any of the Embodiments 1-9, comprising: providing the film-forming resin composition, the first crosslinking agent and the second crosslinking agent; premixing the film-forming resin composition with the first crosslinking agent to obtain a premix; and mixing the second crosslinking agent with the premix to obtain a coatable coating composition.

Embodiment 11: An embodiment of Embodiment 10, wherein the premix has a shelf life of no more than 120 days.

Embodiment 12: An embodiment of any of Embodiments 10-11, wherein the coatable coating composition has a pot life of 4-24 hours or more.

Embodiment 13: A process for preparing a coating composition of and of Embodiments 1-9, comprising: providing the film-forming resin composition, the first crosslinking agent and the second crosslinking agent; and mixing the film-forming resin composition, the first crosslinking agent and the second crosslinking agent to obtain a coatable coating composition.

Embodiment 14: An article, comprising: a substrate having at least one surface; and a coating at least partially applied on the at least one surface and formed from the coating composition according to any one of Embodiments 1-9 or the coating composition obtained by the method according to any one of Embodiments 10-13.

Embodiment 15: An embodiment of Embodiment 14, wherein the substrate comprises wood, cementitious board, metal, or plastic While what has been described with respect to a number of embodiments and examples, those skilled in the art, having benefit of this disclosure, will appreciate that other embodiments can be devised which do not depart from the scope and spirit of the invention as disclosed herein.

The invention claimed is:

1. A coating composition comprising:

a film-forming resin composition comprising an aqueous dispersion of at least one carboxyl functional polymer;

a first crosslinking agent comprising an epoxy silane; and a second crosslinking agent comprising an isocyanate, the isocyanate containing at least one alkoxysilane group.

2. The coating composition according to claim 1, wherein the aqueous dispersion of the at least one carboxyl functional polymer is selected from one or more of aqueous acrylic polymer dispersion, aqueous polyurethane polymer dispersion and aqueous polyurethane/acrylic acid composite dispersion.

3. The coating composition according to claim 1, wherein the epoxy silane has the following formula:

(Formula 1)

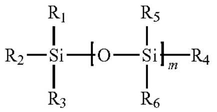

wherein

R1, R2, R4 and R5 are each independently selected from C1-C6 alkyl group, C6-C10 aryl group, halogen, hydroxyl group, C1-C6 alkoxy group, C2-C6 alkenyloxy, C6-C10 aryloxy group, C1-C6 alkanoyloxy and C6-C10 aroyloxy, and wherein R1, R2, R4 and R5 may be the same or different;

R3 and R6 are each independently selected from E-R7, where E is glycidoxy or epoxycyclohexyl, and R7 is a non-hydrolyzable divalent hydrocarbon group having less than 20 carbon atoms or a divalent group composed of C, H, N, S and O atoms (these atoms can be the only atoms that exist in the divalent backbone) having less than 20 carbon atoms; and m is an integer from 0-10.

4. The coating composition according to claim 1, wherein the epoxy silane has an epoxy content in the range of 3.8-5.5 eq/100 g.

5. The coating composition according to claim 1, wherein the isocyanate is selected from one or more of aliphatic polyisocyanate, alicyclic polyisocyanate and aromatic polyisocyanate.

6. The coating composition of claim 1 wherein the isocyanate comprises hexamethylene diisocyanate (HDI) trimer.

7. The coating composition of claim 1, wherein the isocyanate comprises water-dispersible polyisocyanate.

8. The coating composition according to claim 1, characterized in that, relative to the total weight of the coating composition, comprising:

85-99 wt % of the film-forming resin composition;

0.1-5 wt % of the epoxy silane; and 0.5-12 wt % of the isocyanate.

9. A process for preparing a coating composition of claim 1, comprising:

providing the film-forming resin composition, the first crosslinking agent and the second crosslinking agent;

premixing the film-forming resin composition with the first crosslinking agent to obtain a premix; and mixing the second crosslinking agent with the premix to obtain a coatable coating composition.

10. The process for preparing a coating composition according to claim 9, wherein the premix has a shelf life of no more than 120 days.

11. The process for preparing a coating composition according to claim 9, wherein the coatable coating composition has a pot life of 4-24 hours or more.

12. A process for preparing a coating composition of claim 1, comprising:

providing the film-forming resin composition, the first crosslinking agent and the second crosslinking agent; and mixing the film-forming resin composition, the first crosslinking agent and the second crosslinking agent to obtain a coatable coating composition.

13. An article, comprising:

a substrate having at least one surface; and a coating at least partially applied on the at least one surface and formed from the coating composition according to claim 1.

14. The article of claim 13, wherein the substrate comprises wood, cementitious board, metal, or plastic.

15. The coating composition according to claim 8, characterized in that, relative to the total weight of the coating composition, comprising 85-92 wt % of the film-forming resin composition.

16. The coating composition according to claim 1, wherein the aqueous dispersion of the at least one carboxyl functional polymer is present in an amount of at least 50% by weight relative to the total weight of the film-forming resin composition.

17. The coating composition according to claim 1, wherein the second crosslinking agent further comprises an isocyanate that does not contain an alkoxysilane group.

18. The coating composition according to claim 1, wherein the epoxy silane of the first crosslinking agent is multifunctional.

19. The coating composition according to claim 1, wherein the first crosslinking agent is present in the amount of at most 1% by weight relative to the total weight of the coating composition.

20. The coating composition according to claim 1, wherein the second crosslinking agent is present in the amount of at most 2% by weight relative to the total weight of the coating composition.

* * * * *